United States Patent [19]

Nakajima

[11] Patent Number: 4,806,756
[45] Date of Patent: Feb. 21, 1989

[54] METHOD OF ADJUSTING RADIATION IMAGE READ-OUT CONDITIONS

[75] Inventor: Nobuyoshi Nakajima, Kanagawa, Japan

[73] Assignee: Fuji Photo Film CO., Ltd., Kanagawa, Japan

[21] Appl. No.: 912,036

[22] Filed: Sep. 29, 1986

[30] Foreign Application Priority Data

Sep. 27, 1985 [JP] Japan .................. 60-213897

[51] Int. Cl.$^4$ .................. G01N 23/04; H04N 5/30
[52] U.S. Cl. .................. 250/327.2; 250/484.1
[58] Field of Search .......... 250/327.2, 484.1, 327.2 C, 250/327.2 G, 484.1 B; 364/414; 382/22, 54; 358/284, 282

[56] References Cited

U.S. PATENT DOCUMENTS 4,519,041  5/1985  Fant et al. .................. 382/22
4,636,641  1/1987  Mori et al. .................. 250/327.2

OTHER PUBLICATIONS

"Image Contract Enhance . . ." by P. Jackson IBM Tech Dis Bull. vol. 24, No. 12 May-82.

Primary Examiner—Janice A. Howell
Assistant Examiner—Richard Hanig
Attorney, Agent, or Firm—Sughrue, Mion, Zinn, Macpeak and Seas

[57] ABSTRACT

In a method of adjusting read-out conditions for a radiation image stored on a stimulable phosphor sheet by limiting the irradiation field in a rectangular form, digital image signals at respective positions on the stimulable phosphor sheet are detected based on image information obtained by preliminary read-out. X and Y axes are set along two adjacent sides of a contour of the rectangular irradiation field on the stimulable phosphor sheet. The digital image signals are added up in the X and Y axis directions respectively, and positions on the Y axis at which the levels of the added-up signals in the X axis direction are equal to a predetermined threshold value Th and the positions on the X axis at which the levels of the added-up signals in the Y axis directions are equal to the threshold value Th are detected. A region surrounded by straight lines passing through these positions along the X and Y axes is recognized as the irradiation field. The read-out conditions for final read-out are adjusted based on the preliminary read-out image information within the irradiation field.

7 Claims, 3 Drawing Sheets

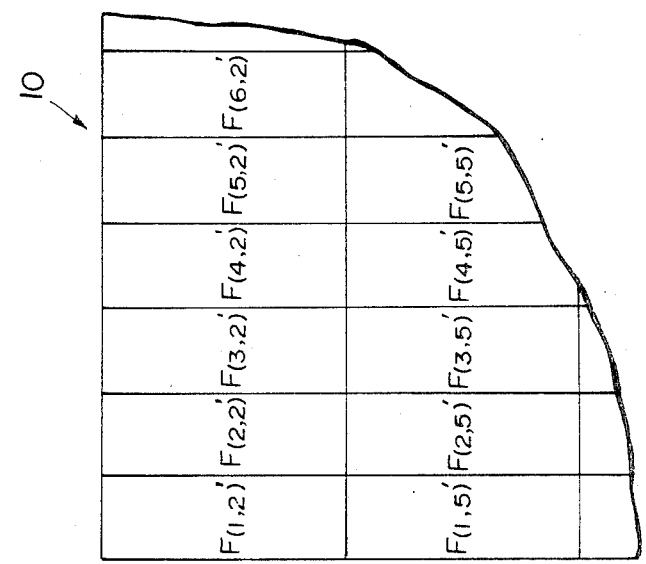
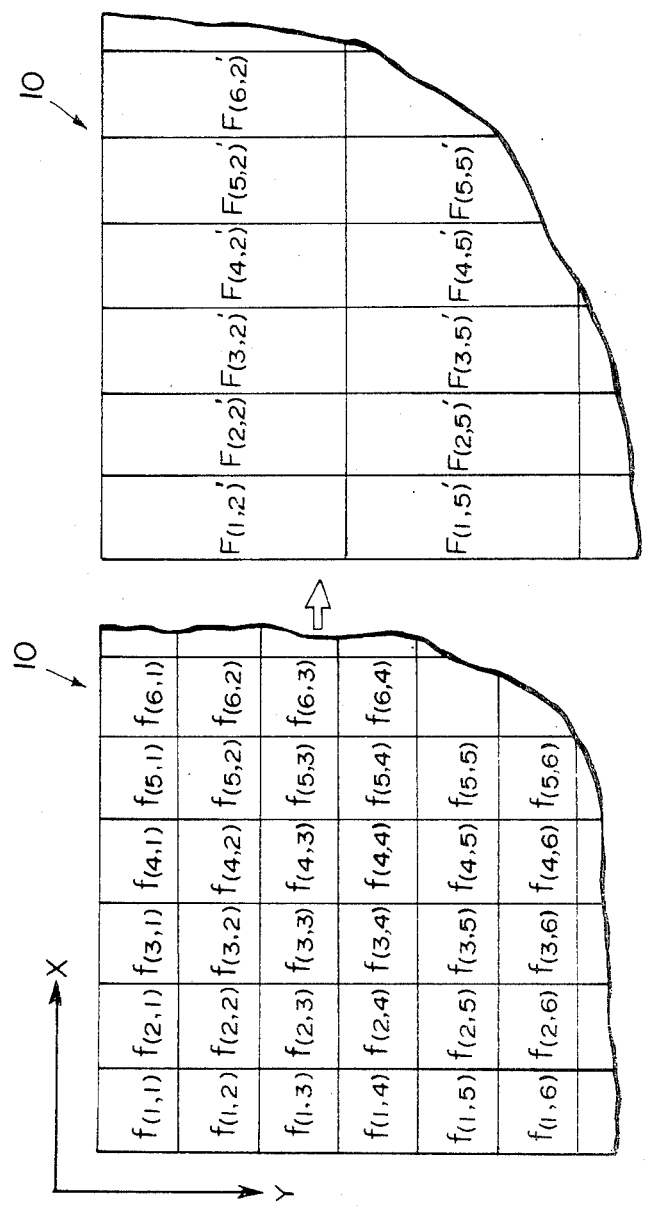

METHOD OF ADJUSTING RADIATION IMAGE READ-OUT CONDITIONS

BACKGROUND OF THE INVENTION

1. Field of the Invention

This invention relates to a method of adjusting radiation image read-out conditions in a radiation image recording and reproducing system using a stimulable phosphor sheet.

2. Description of the Prior Art

When certain kinds of phosphors are exposed to a radiation such as X-rays, $\alpha$-rays, $\beta$-rays, $\gamma$-rays, cathode rays or ultraviolet rays, they store a part of the energy of the radiation. Then, when the phosphor which has been exposed to the radiation is exposed to stimulating rays such as visible light, light is emitted by the phosphor in proportion to the stored energy of the radiation. A phosphor exhibiting such properties is referred to as a stimulable phosphor.

As disclosed in U.S. Pat. No. 4,258,264 and Japanese Unexamined Patent Publication No. 56(1981)-11395, it has been proposed to use a stimulable phosphor in a radiation image recording and reproducing system. Specifically, a sheet provided with a layer of the stimulable phosphor (hereinafter referred to as a stimulable phosphor sheet) is first exposed to a radiation passing through an object to have a radiation image stored thereon, and is then scanned with stimulating rays such as a laser beam which cause it to emit light in the pattern of the stored image. The light emitted by the signal, which is processed as desired to reproduce a visible image on a recording medium such as a photoelectric film or on a display device such as a cathode ray tube (CRT).

One embodiment of the aforesaid radiation image recording and reproducing system is disclosed, for example, in Japanese Unexamined Patent Publication No. 58(1983)-67240. In the embodiment, before final read-out is conducted by scanning the stimulable phosphor sheet carrying a radiation image of an object stored thereon by stimulating rays which cause the stimulable phosphor sheet to emit light in proportion to the radiation energy stored, detecting the emitted light by a photoelectric read-out means and converting it into an electric image signal, preliminary read-out for approximately detecting the image information stored on the stimulable phosphor sheet is conducted by use of stimulating rays of a level lower than the level of the stimulating rays used in the final read-out. Read-out conditions for the final read-out are adjusted on the basis of the information obtained by the preliminary read-out, and the final read-out is conducted by use of the read-out conditions. The electric image signal obtained by the final read-out is sent to an image processing means and is processed in accordance with the image recording portion of the object and/or the image recording method to obtain a visible image suitable for viewing, particularly for diagnostic purposes. The processed image signal is used to reproduce the visible image on a photographic film or the like.

By the term "read-out conditions" as used herein are meant various conditions affecting the relationship between the amount of the light emitted by the stimulable phosphor sheet at the read-out step and the output of the read-out apparatus, for example, the read-out gain (sensitivity) determining the relationship between the input and the output of the read-out apparatus, the scale factor (latitude), and the power of the stimulating rays used for read-out.

As described above, the level of the stimulating rays used in the preliminary read-out is lower than the level of the stimulating rays used in the final read-out. That is, the effective energy of the stimulating rays which the stimulable phosphor sheet receives per unit area in the preliminary read-out should be lower than the effective energy of the stimulating rays used in the final read-out. In order to make the level of the stimulating rays used in the preliminary read-out lower than the level of the stimulating rays in the final read-out, the output of the stimulating ray source such as a laser beam source may be decreased in the preliminary read-out, or the stimulating rays emitted by the stimulating ray source may be attenuated by an ND filter, an AOM, or the like, positioned in the optical path. Alternatively, a stimulating ray source for the preliminary read-out may be positioned independently of the stimulating ray source for the final read-out, and the output of the former may be made lower than the output of the latter. Or, the beam diameter of the stimulating rays may be increased, the scanning speed of the stimulating rays may be increased, or the moving speed of the stimulable phosphor sheet may be increased in the preliminary read-out.

When the image information stored on the stimulable phosphor sheet is approximately detected prior to the final read-out and the final read-out is conducted by use of the read-out conditions adjusted on the basis of the image information, it becomes possible to eliminate adverse effects of a fluctuation in the level of the radiation energy stored on the stimulable phosphor sheet, which is caused by a change in the object or the image recording portion thereof, by a fluctuation in the radiation dose, or the like, and to conduct the final read-out by use of desirable read-out conditions.

As the method of adjusting the read-out conditions in the final read-out on the basis of the image information obtained by the preliminary read-out, the applicant proposed in Japanese Patent Application No. 59(1984)-12658 a novel method comprising the steps of: determining a histogram of the amount of light emitted by a stimulable phosphor sheet in the preliminary read-out, calculating the maximum light emission amount Smax and the minimum light emission amount Smin of a desired image information range in the histogram, and adjusting the read-out conditions in the final read-out so that the maximum light emission light amount Smax and the minimum light emission amount Smin correspond respectively to the maximum signal level Qmas and the minimum signal level Qmin of a desired input signal range in the image processing means which are determined by the maximum density Dmax and the minimum density Dmin of a correct density range in the reproduced visible image.

On the other hand, in the case where the radiation image recording and reproducing system is used for medical diagnosis, portions of the human body not related to diagnosis should not be exposed to radiation since the radiation is harmful to the human body. Further, when the human body portions not related to diagnosis are exposed to radiation, the radiation is scattered by such portions to the portion related to the diagnosis, and the contrast and resolution are adversely affected by the scattered radiation. Therefore, in many cases, the irradiation field should be limited when a radiation image is recorded. Normally, when the irradiation field is limited, radiation scattered by the object within the irradiation field passes outside of the irradiation field. The scattered radiation is absorbed and stored on the stimulable phosphor sheet which exhibits high sensitivity, and therefore the histogram of the light emission amount obtained by the preliminary read-out includes the light emission amount caused by the scattered radiation. Since the light emission amount caused by the scattered radiation outside of the irradiation field on the stimulable phosphor sheet is often equal to or larger than the light emission amount within the irradiation field, it is not always possible to discriminate between the light emission amounts inside and outside of the irradiation field of the histogram obtained by the preliminary read-out. As a result, when Smas and Smin are calculated from the histogram as described above and the read-out conditions are adjusted on the basis of Smax and Smin, the minimum light emission amount within the irradiation field is not detected as Smin, and that caused by the scattered radiation outside of the irradiation field is detected as Smin. In general, the minimum light emission amount outside of the irradiation field is smaller than that within the irradiation field. Accordingly, when the minimum light emission amount outside of the irradiation field is detected as Smin, signals caused by the scattered radiation not related to diagnosis are taken within a low density range in the final read-out, and the density of the image of the portion related to diagnosis becomes too high. As a result, the image contrast decreases and it becomes difficult to make an accurate diagnosis.

Namely, when a radiation image is recorded by limiting the irradiation field, radiation scattered by the object passes outside of the irradiation field on the stimulable phosphor sheet and causes noise in the image information obtained by the preliminary read-out. Therefore, when the read-out conditions are adjusted based on such preliminary read-out image information, it is not always possible to adjust the read-out conditions to appropriate values and to obtain a visible image suitable for viewing, particularly for diagnostic purposes.

SUMMARY OF THE INVENTION

The primary object of the present invention is to provide a method of adjusting radiation image read-out conditions for final read-out to appropriate values on the basis of image information obtained by preliminary read-out, wherein problems caused by irradiation field limitation are eliminated when image recording is conducted by limiting the irradiation field in a rectangular form.

Another object of the present invention is to provide a method of adjusting radiation image read-out conditions wherein the range of the irradiation field on a stimulable phosphor sheet is detected quickly and accurately on the basis of image information obtained by the preliminary read-out, whereby the read-out conditions are adjusted to appropriate values.

The present invention provides a method of adjusting radiation image read-out conditions in which preliminary read-out conducted by exposing a stimulable phosphor sheet carrying a radiation image of an object stored thereon by limitation of an irradiation field in a rectangular form to stimulating rays of a level lower than the level of stimulating rays used in final read-out and detecting the radiation image stored on the stimulable phosphor sheet is carried out prior to the final read-out wherein the stimulable phosphor sheet is exposed to stimulating rays which cause the stimulable phosphor sheet to emit light in proportion to the stored radiation energy and the emitted light is photoelectrically detected to obtain electric image signals used for reproducing a visible image, and read-out conditions in the final read-out are adjusted on the basis of the image information obtained by the preliminary read-out, wherein the improvement comprises the steps of:

(i) detecting digital image signals at respective positions on said stimulable phosphor sheet on the basis of the image information obtained by said preliminary read-out, (ii) setting an X axis and a Y axis along two adjacent sides of a contour of said rectangular irradiation field on said stimulable phosphor sheet, (iii) adding up said digital image signals in said X axis direction and in said Y axis direction, detecting positions on said Y axis at which the levels of the added-up signals in said X axis direction are equal to a predetermined threshold value Th, and detecting positions on said X axis at which the levels of the added-up signals in said Y axis direction are equal to the predetermined threshold value Th, (iv) recognizing a region, which is surrounded by straight lines in said X axis direction at said positions on said Y axis and straight lines in said Y axis direction at said positions on said X axis on said stimulable phosphor sheet, as the irradiation field, and (v) adjusting said read-out conditions in said final read-out on the basis of the image information obtained within said irradiation field by said preliminary read-out.

With the method of adjusting radiation image read-out conditions in accordance with the present invention, since the irradiation field is detected based on the added-up signals obtained by adding up the digital image signals in the X axis direction and in the Y axis direction set along the rectangular irradiation field contour, and based on the threshold value Th determined appropriately, it is possible to detect the irradiation field quickly and accurately with a very simple algorithm. Also, since the read-out conditions in the final read-out are adjusted based on the preliminary read-out image information within the irradiation field thus detected, it is possible to eliminate adverse effects of scattered radiation impinging upon sheet portions outside of the irradiation field and to always adjust the read-out conditions in the final read-out to appropriate values.

BRIEF DESCRIPTION OF THE DRAWINGS

FIGS. 2A and 2B are enlarged views of a portion G of FIG. 1 and respectively show examples of digital image signals at respective positions on the stimulable phosphor sheet.

DESCRIPTION OF THE PREFERRED EMBODIMENTS

The present invention will hereinbelow be described in further detail with reference to the accompanying drawings.

Figure 1:
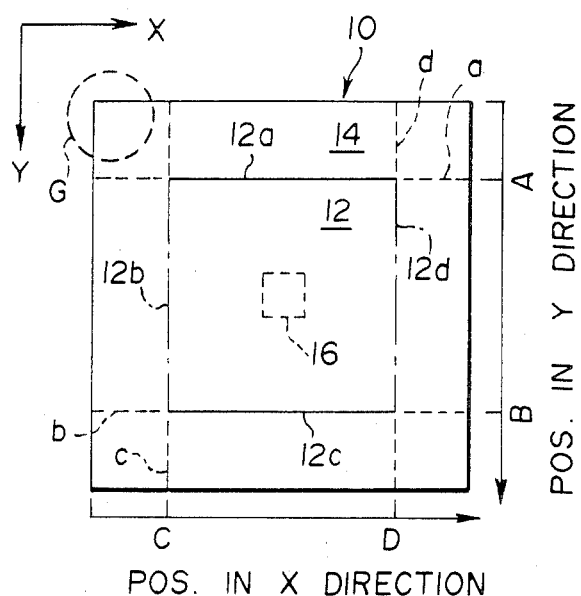
FIG. 1 is a schematic view showing the stimulable phosphor sheet carrying a radiation image stored thereon by limitation of the irradiation field in a rectangular form.

The embodiments of the method of adjusting radiation image read-out conditions in accordance with the present invention are for the case where image read-out is conducted on a stimulable phosphor sheet 10 carrying a radiation image stored thereon by limitation of the irradiation field in a rectangular form 12 as indicated by the chain lines in FIG. 1.

In this method, digital image signals at respective positions on the stimulable phosphor sheet 10 are first detected from image information obtained by the preliminary read-out as mentioned above.

By "image information obtained by preliminary read-out" is meant the information which is obtained by detecting the light emitted by the stimulable phosphor sheet during preliminary read-out scanning with stimulating rays by use of a photoelectric conversion means and which is constituted by electric signals corresponding to light emission amounts at respective scanning points, i.e. respective picture elements, on the stimulable phosphor sheet. Of course, the information corresponds to the radiation image stored on the stimulable phosphor sheet.

FIG. 2A is an enlarged view showing the portion G of the stimulable phosphor sheet 10 in FIG. 1. In FIG. 2A, respective cells indicate the respective picture elements, and f(1,1), f(1,2), ... represent the digitized preliminary read-out image information at picture elements (1,1), (1,2), ....

In order to obtain the digital image signals at the respective positions on the stimulable phosphor sheet from the preliminary read-out image information, it is necessary to set the positions on the stimulable phosphor sheet. The positions may be set in the unit of the picture element, or a plurality of the picture elements related to each other, for example, three to five picture elements arrayed in a predetermined direction may be set as one position. In the former case, by "digital image signals at respective positions" are meant signals obtained by digitizing the aforesaid image information at the picture element corresponding to each position. In the latter case, by "digital image signals at respective positions" are meant signals determined on the basis of the aforesaid image information at a plurality of the picture elements included in each position, for example, a digital image signal obtained by averaging the image information at the plurality of the picture elements.

In this embodiment, the position setting is conducted in the unit of the picture element as in the former case. Position setting as in the latter case will be described later with reference to FIG. 2B.

Thereafter, the digital image signals obtained as mentioned above are added up in the directions of an X axis and a Y axis which are set on the stimulable phosphor sheet 10 along adjacent sides 12a and 12b of the contour of the rectangular irradiation field 12. As shown in FIGS. 1 and 2A, in ordinary image recording, the sides of stimulable phosphor sheet 10 are parallel to the rectangular contour of the irradiation field. Therefore, the X and Y axes are parallel to the two adjacent sides of the stimulable phosphor sheet 10, and coincide respectively with the main scanning direction and the sub-scanning direction in the preliminary read-out and the final read-out.

Additions of the digital image signals in the X axis direction and in the Y axis direction are conducted as described below. The positions forming in line in the X axis direction are taken as a line, and the positions forming in line in the Y axis direction are taken as a line. Specifically, the line of positions (1,1), (2,1), (3,1), (4,1), (5,1), ... in the X axis direction is taken as the first line Lx1 in the X axis direction, and the line of positions (1,2), (2,2), (3,2), (4,2), (5,2), ... is taken as the second line Lx2 in the X axis direction. In the same manner, the third line Lx3, the fourth line Lx4, ... in the X axis direction are determined sequentially. Also, the line of positions (1,1), (1,2), (1,3), (1,4), ... in the Y axis direction is taken as the first line Ly1 in the Y axis direction, and the line of positions (2,1), (2,2), (2,3), (2,4), ... is taken as the second line Ly2 in the Y axis direction. In the same manner, the third line Ly3, the fourth line Ly4, ... in the Y axis direction are determined sequentially. For each of the lines thus determined, the digital image signals at the respective positions on the line are added up.

Figure 3:
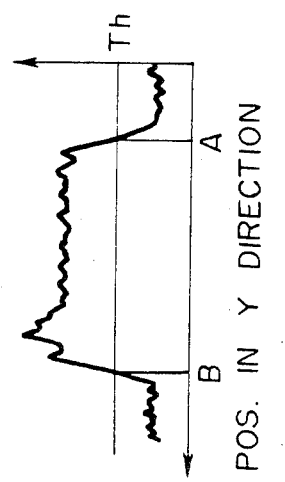
FIG. 3 is a graph showing the added-up signals obtained by adding up the digital image signals in the X axis direction.
Figure 4:
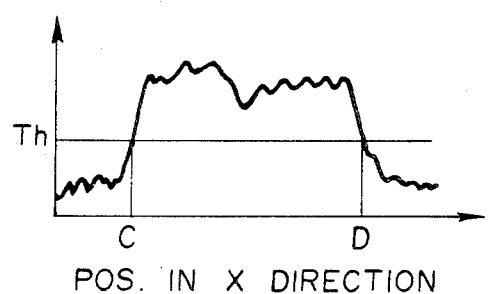
FIGS. 4 and 5 are graphs showing the added-up signals obtained by adding up the digital image signals in the Y axis direction.

The added-up signals obtained by adding up the digital image signals in the X axis direction are shown in FIG. 3, and those obtained by adding up the digital image signals in the Y axis direction are shown in FIG. 4.

In the case where image recording is carried out by limiting the irradiation field, since little radiation impinges upon a region 14 outside of the irradiation field 12 on the stimulable phosphor sheet 10, the image signals at the region 14 are of a low level. In the irradiation field 12, since the radiation passing through an object or outside of the object impinges upon the stimulable phosphor sheet 10 within the irradiation field 12, the image signals become of a high level.

Therefore, in the case where the irradiation field 12 is rectangular as shown, when the X axis and the Y axis are set along adjacent sides 12a and 12b of the contour of the irradiation field 12 and the digital image signals are added up in the X axis direction, the added-up signals at regions on the Y axis outside of the irradiation field 12 are of a low level as shown in FIG. 3, and the added-up signals at the region on the Y axis within the irradiation field 12 are of a very high level. Also, as shown in FIG. 4, when the digital image signals are added up in the Y axis direction, the added-up signals at the regions on the X axis outside of the irradiation field 12 are of a low level, and the added-up signals at the region on the X axis within the irradiation field 12 are of a very high level.

Therefore, the irradiation field 12 may be recognized by studying the added-up signals obtained by the addition of the digital image signals in the X axis direction and in the Y axis direction, and detecting the region on the stimulable phosphor sheet 10 where the levels of the added-up signals are higher than those at the other regions.

In the present invention, the high level region, i.e. the irradiation field 12, is detected by use of a threshold value Th adjusted to an appropriate value.

Specifically, an approximately median level value between the high level value and the low level value of the added-up signals may be determined by an appropriate method, and used as the threshold value Th. Positions A and B on the Y axis as shown in FIG. 3, at which the levels of the added-up signals in the X axis direction are equal to the predetermined threshold value Th, are detected. Also, positions C and D on the X axis as shown in FIG. 4, at which the levels of the added-up signals in the Y axis direction are equal to the predetermined threshold value Th, are detected. As shown in FIG. 1, the region on the stimulable phosphor sheet 10 surrounded by straight lines a and b in the X axis direction at the positions A and B on the Y axis and straight lines c and d in the Y axis direction at the positions C and D on the X axis is recognized as the irradiation field 12.

The threshold value Th may also be determined in various manners, some examples of which are described below.

First, a characteristic value such as an average value, a median value or the minimum value or the digital image signals within a predetermined region 16 at the center of the stimulable phosphor sheet 10 as shown in FIG. 1, for example, within a 5 cm×5 cm rectangular region, may be calculated, and a value obtained by multiplying the characteristic value by $1/\alpha$ may be used as the threshold value Th. This method is based on the presumption that the region at the center of the stimulable phosphor sheet 10 is always included in the irradiation field 12. The characteristic value such as the average value, the median value or the minimum value of the image signals at the center region of the sheet 10 represents the image signals within the irradiation field 12. Therefore, when the characteristic value is multiplied by $1/\alpha$ wherein $\alpha$ denotes a value adjusted appropriately by considering the number of signals present on the line in the X axis direction or in the Y axis direction, the safety factor, or the like, it is possible to obtain such a threshold value Th that the region where the levels of the added-up signals are higher than the threshold value Th is the irradiation field 12, and the region where the levels of the added-up signals are lower than the threshold value Th is the region 14 outside of the irradiation field.

Figure 5:
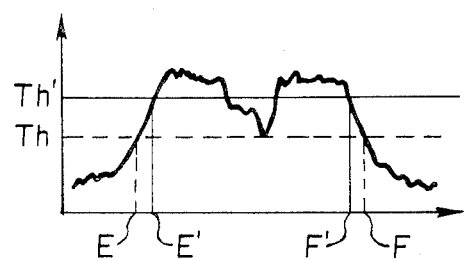

In a second method, a temporary threshold value Th' may be calculated by multiplying the characteristic value of the image signals at the predetermined center region 16 by $1/\alpha$ in the same manner as in the aforesaid first method. Then, as shown in FIG. 5, positions E' and F' at which the levels of the added-up signals are equal to the temporary threshold value Th' are detected, and the minimum value of the added-up signals between the positions E' and F' is taken as the threshold value Th. In this case, of course, the range between the positions E and F at which the levels of the added-up signals are equal to the threshold value Th is recognized as the irradiation field 12. In the case where the minimum value of the added-up signals between the positions E' and F' is equal to the temporary threshold value Th', the minimum value Th' is taken as the threshold value Th.

Figure 6A:
FIG. 6A is a graph showing the added-up signals obtained by adding up the digital the digital image signals in the Y axis direction.
Figure 6B:
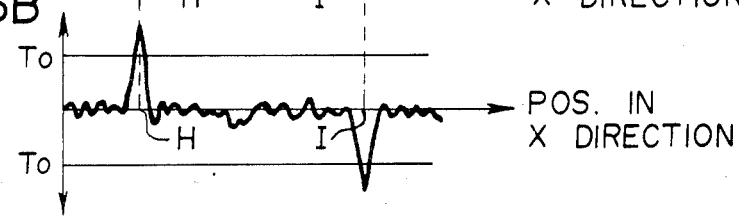
FIG. 6B is a graph showing the differentiated values of the added-up signals shown in FIG. 6A.

In a third method, the added-up signals in the x axis direction and the added-up signals in the Y axis direction are respectively differentiated, and the added-up signal value at a point where the absolute value of the differentiated value exceeds a predetermined threshold value To is taken as the threshold value Th. FIG. 6A shows an example of the added-up signals obtained by adding up the digital image signals in the Y axis direction, and FIG. 6B shows differentiated values obtained by differentiation of the added-up signals shown in FIG. 6A. For example, as shown in FIGS. 6A and 6B, at the contour portions of the irradiation field, the added-up signals change sharply from a low level to a high level or vice versa, and therefore the absolute values of the differentiated values become far larger than those at the other portions. Based on these findings, an appropriate threshold value To is determined, positions H and I as shown in FIG. 6B at which the absolute values of the differentiated values exceed the threshold value To are detected, and the levels of the added-up signals at the positions H and I are taken as the threshold value Th as shown in FIG. 6A. FIGS. 6A and 6B show the case where the added-up signals at the positions H and I are of the same level. When the added-up signals at the positions H and I are of different values, the lower value, the average value, or the like thereof may be taken as the threshold value Th.

After the irradiation field is recognized in the manner as described above, the read-out conditions for the final read-out are adjusted on the basis of the preliminary read-out image information only within the irradiation field. The read-out conditions may be adjusted in various manners based on the preliminary read-out image information within the irradiation field, for example, by creating a histogram of the light emission amounts within the irradiation field as mentioned above, calculating the maximum light emission amount Smax and the minimum light emission amount Smin from the histogram, and adjusting the read-out conditions on the basis of Smax and Smin.

The read-out conditions may be adjusted on the basis of the preliminary read-out image information within the irradiation field and by considering the image recording portion of the object such as the head, the chest or the abdomen, and the image recording method such as plain image recording, contrasted image recording, tomography or enlarged image recording.

After the irradiation field is recognized and the irradiation field for the final read-out is adjusted based on the image information within the irradiation field, the final read-out is conducted by use of the read-out conditions thus adjusted. As disclosed in Japanese Unexamined Patent Publication No. 60(1985)-120346, the final read-out region should preferably be limited within the irradiation field thus recognized. When the final read-out region is limited within the irradiation field, noise components caused by scattered radiation and stored outside of the irradiation field on the stimulable phosphor sheet are not read out, and it is possible to obtain a reproduced visible image having a high image quality. Also, since the read-out region is limited, it becomes possible to shorten the read-out time or to increase the read-out density.

In the aforesaid embodiment, position setting on the stimulable phosphor sheet 10 is conducted in the unit of the picture element, and the digital image signals are obtained at the respective picture elements. However, it is also possible to determine a plurality of the picture elements related to each other as one position and to obtain the digital image signals at the respective positions thus determined. An example of such a method will hereinbelow be described.

In the example described below, the digital image signals in the case where they are added up in the X axis direction and the digital image signals in the case where they are added up in the Y axis direction are obtained independently.

First, in the case where the digital image signals are added up in the X axis direction, as shown in FIG. 2B, sets of three picture elements adjacent in the Y axis direction in FIG. 2A are determined as the respective positions as expressed by $$\text{Position } (1,2)' = \text{picture elements } (1,1) + (1,2) + (1,3)$$
$$\text{Position } (2,2)' = \text{picture elements } (2,1) + (2,2) + (2,3)$$
$$\vdots$$
$$\text{Position } (1,5)' = \text{picture elements } (1,4) + (1,5) + (1,6)$$
$$\text{Position } (2,5)' = \text{picture elements } (2,4) + (2,5) + (2,6)$$
$$\vdots$$

Digital image signals F at the respective positions are calculated as $$F(1,2)' = (\, f(1,1) + f(1,2) + f(1,3)\, )/3$$
$$F(2,2)' = (\, f(2,1) + f(2,2) + f(2,3)\, )/3$$
$$\vdots$$
$$F(1,5)' = (\, f(1,4) + f(1,5) + f(1,6)\, )/3$$
$$F(2,5)' = (\, f(2,4) + f(2,5) + f(2,6)\, )/3$$
$$\vdots$$

Second, in the case where the digital image signals are added up in the Y axis direction, sets of three picture elements adjacent in the X axis direction in FIG. 2A are determined as the respective positions as expressed by $$\text{Position } (2,1)' = \text{picture elements } (1,1) + (2,1) + (3,1)$$
$$\text{Position } (2,2)' = \text{picture elements } (1,2) + (2,2) + (3,2)$$
$$\vdots$$
$$\text{Position } (5,1)' = \text{picture elements } (4,1) + (5,1) + (6,1)$$
$$\text{Position } (5,2)' = \text{picture elements } (4,2) + (5,2) + (6,2)$$
$$\vdots$$

The digital image signals F at the respective positions are calculated by arithmetic averaging in the same manner as described above for the positions $(1,2)', (2,2)', \ldots$ The process of the position setting and the calculation of the digital image signals is equivalent to pre-processing of the preliminary read-out image information at the respective picture elements followed by adding-up processing or the like. When the pre-processing is carried out, it is possible to eliminate adverse effects of noise included in the image information, and to decrease the number of image signals which should be processed. As a result, it becomes possible to detect the irradiation field contour quickly and at a higher accuracy.

Figures 7A, 7B, 7D:
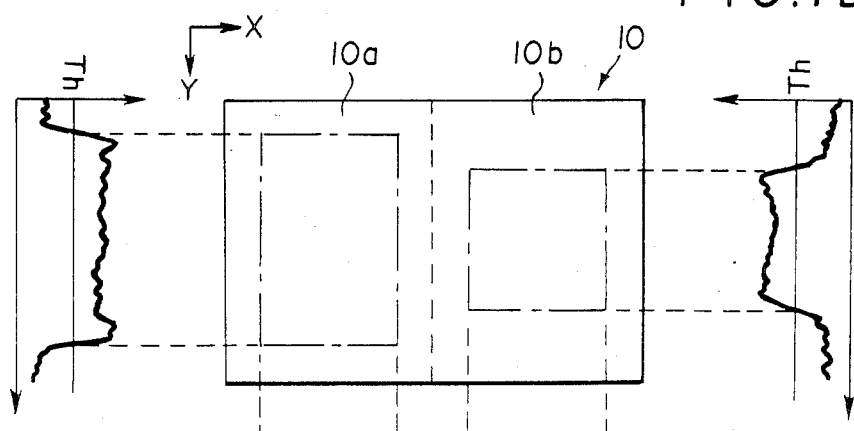
FIG. 7A is a schematic view showing the stimulable phosphor sheet carrying radiation image stored thereon by subdivision image recording.
FIGS. 7B to 7E are graphs showing the added-up signals obtained by adding up the digital image signals in the X axis direction and in the Y axis direction.
Figures 7C, 7E:

The present invention is applicable also to the case of subdivision image recording wherein the stimulable phosphor sheet 10 is divided, for example, into two subdivisions 10a and 10b as shown in FIG. 7A and image recording is conducted at each subdivision by limiting the irradiation field. In this case, the present invention may be applied to the subdivisions 10a and 10b respectively by obtaining in advance the information on the subdivision image recording. Specifically, for the subdivision 10a, the aforesaid method may be applied by obtaining the added-up signals in the Y axis direction and in the X axis direction at the subdivision 10a as shown in FIGS. 7B and 7C. For the subdivision 10b, the aforesaid method may be applied by obtaining the added-up signals in the Y axis direction and in the X axis direction at the subdivision 10b as shown in FIGS. 7D and 7E.

Also, in the embodiment of FIG. 1, after the positions A and B on the Y axis as shown in FIG. 3 are detected, adding up of the digital image signals in the Y axis direction for detecting the positions C and D on the X axis may be carried out only on the image signals between the positions A and B.

I claim:

1. A method of adjusting radiation image read-out conditions in which preliminary read-out conducted by exposing a stimulable phosphor sheet carrying a radiation image of an object stored thereon by limitation of an irradiation field in a rectangular form to stimulating rays of a level lower than the level of stimulating rays used in final read-out and detecting the radiation image stored on the stimulable phosphor sheet is carried out prior to the final read-out wherein the stimulable phosphor sheet is exposed to stimulating rays which cause the stimulable phosphor sheet to emit light in proportion to the stored radiation energy and the emitted light is photoelectrically detected to obtain electric image signals used for reproducing a visible image, and read-out conditions in the final read-out are adjusted on the basis of the image information obtained by the preliminary read-out, wherein the improvement comprises the steps of:
 (i) detecting digital image signals at respective positions on said stimulable phosphor sheet on the basis of the image information obtained by said preliminary read-out,
 (ii) setting an X axis and a Y axis along two adjacent sides of a contour of said rectangular irradiation field on said stimulable phosphor sheet,
 (iii) adding up said digital image signals in said X axis direction and in said Y axis direction, detecting positions on said Y axis at which the levels of the added-up signals in said X axis direction are equal to a predetermined threshold value Th, and detecting positions on said X axis at which the levels of the added-up signals in said Y axis direction are equal to the predetermined threshold value Th,
 (iv) determining a region, which is surrounded by straight lines in said X axis direction at said positions on said Y axis and straight lines in said Y axis direction at said positions on said X axis on said stimulable phosphor sheet, as the irradiation field, and
 (v) adjusting said read-out conditions in said final read-out on the basis of the image information obtained within said irradiation field by said preliminary read-out.

2. A method as defined in claim 1 wherein each of said positions on said stimulable phosphor sheet comprises a single picture element.

3. A method as defined in claim 1 wherein each of said positions on said stimulable phosphor sheet comprises a plurality of picture elements related to each other, and each of said digital image signals at respective positions is determined on the basis of said image information at said plurality of picture elements included in each of said positions.

4. A method as defined in claim 3 wherein each of said digital image signals at respective positions is determined by arithmetic averaging of said image information at said plurality of picture elements included in each of said positions.

5. A method as defined in claim 1 wherein a characteristic value of the digital image signals within a predetermined region at the center of said stimulable phosphor sheet is calculated, and a value obtained by multiplying said characteristic value by $1/\alpha$ wherein $\alpha$ denotes a value adjusted by consideration of the number of said digital image signals present in said X axis direction or in said Y axis direction, a safety factor or the like is used as said threshold value Th.

6. A method as defined in claim 1 wherein a characteristic value of the digital image signals within a predetermined region at the center of said stimulable phosphor sheet is calculated, a temporary threshold value Th' is calculated by multiplying said characteristic value by $1/\alpha$ wherein $\alpha$ denotes a value adjusted by consideration of the number of said digital image signals present in said X axis direction or in said Y axis direction, a safety factor or the like, positions at which the levels of the added-up signals are equal to said temporary threshold value Th' are detected and the minimum value of the added-up signals between said detected positions is used as said threshold value Th.

7. A method as defined in claim 1 wherein the added-up signals in said X axis direction and the added-up signals in said Y axis direction are respectively differentiated, and the added-up signal value at a point where the absolute value of the differentiated value exceeds a predetermined threshold value To is used as said threshold value Th.

* * * * *